United States Patent
Nakazawa et al.

(10) Patent No.: US 9,851,867 B2
(45) Date of Patent: Dec. 26, 2017

(54) PORTABLE ELECTRONIC DEVICE, METHOD OF CONTROLLING SAME, AND PROGRAM FOR INVOKING AN APPLICATION BY DRAGGING OBJECTS TO A SCREEN EDGE

(75) Inventors: Masashi Nakazawa, Yokohama (JP); Ayano Nakamura, Yokohama (JP); Shuji Ishikawa, Yokohama (JP); Shinya Ishizaki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 621 days.

(21) Appl. No.: 13/879,537

(22) PCT Filed: Oct. 13, 2011

(86) PCT No.: PCT/JP2011/073497
§ 371 (c)(1),
(2), (4) Date: Jul. 16, 2013

(87) PCT Pub. No.: WO2012/050153
PCT Pub. Date: Apr. 19, 2012

(65) Prior Publication Data
US 2013/0298054 A1    Nov. 7, 2013

(30) Foreign Application Priority Data
Oct. 15, 2010 (JP) .................................. 2010-232955

(51) Int. Cl.
*G06F 3/0486* (2013.01)
*G06F 3/0482* (2013.01)
*G06F 3/0488* (2013.01)

(52) U.S. Cl.
CPC .......... *G06F 3/0482* (2013.01); *G06F 3/0486* (2013.01); *G06F 3/04883* (2013.01); *G06F 2203/04803* (2013.01)

(58) Field of Classification Search
None
See application file for complete search history.

(56) References Cited

U.S. PATENT DOCUMENTS 6,313,853 B1 * 11/2001 Lamontagne et al. ........ 715/762
7,441,202 B2 * 10/2008 Shen et al. .................... 715/769
(Continued)

FOREIGN PATENT DOCUMENTS

JP    03-042713       2/1991
JP    09-018566 A    1/1997
(Continued)

OTHER PUBLICATIONS

Notice of Reasons for Rejection issued to JP Application No. 2010-232955, dated Aug. 19, 2014.

*Primary Examiner* — Abdullah Al Kawsar
*Assistant Examiner* — Daniel Samwel
(74) *Attorney, Agent, or Firm* — Hauptman Ham, LLP

(57) ABSTRACT

A portable electronic device capable of more easily selecting a desired text input application, a method of controlling the same, and a program are provided. In a state in which characters or an image is displayed on a display of a portable telephone, an instruction is given such that either the image or at least one of the characters (for example, the characters "a", "i", "u", and "e" on a region) is selected and then the character or the image is moved to an end region (for example, the right side of an end region). Consequently, the portable telephone starts a text input application storing the character associated with the end region (for example, a notepad application) and the selected character or image is input.

12 Claims, 10 Drawing Sheets

(56) References Cited

U.S. PATENT DOCUMENTS

| | | | |
|---|---|---|---|
| 7,750,893 B2* | 7/2010 | Hashimoto et al. | 345/173 |
| 2005/0154991 A1* | 7/2005 | Jaeger | 715/769 |
| 2008/0166049 A1* | 7/2008 | Wang | G06K 9/222 |
| | | | 382/189 |
| 2008/0174568 A1* | 7/2008 | Kim | G06F 3/04886 |
| | | | 345/173 |
| 2010/0085318 A1* | 4/2010 | Lee et al. | 345/173 |
| 2011/0157028 A1* | 6/2011 | Stallings | G06F 3/04883 |
| | | | 345/173 |
| 2012/0054657 A1* | 3/2012 | Nurmi | G06F 3/0481 |
| | | | 715/769 |

FOREIGN PATENT DOCUMENTS

| | | |
|---|---|---|
| JP | 10-049289 | 2/1998 |
| JP | 2007-200243 A | 8/2007 |
| JP | 2007-251522 A | 9/2007 |
| WO | 2004/104807 A1 | 12/2004 |

* cited by examiner

PORTABLE ELECTRONIC DEVICE, METHOD OF CONTROLLING SAME, AND PROGRAM FOR INVOKING AN APPLICATION BY DRAGGING OBJECTS TO A SCREEN EDGE

CROSS-REFERENCE TO RELATED APPLICATIONS

This application is a National Stage application of International Application No. PCT/JP2011/073497, filed Oct. 13, 2011, which claims benefit to Japanese Application No. 2010-232955, filed Oct. 15, 2010, each of which are incorporated by reference herein in their entirety.

BACKGROUND

Field

The present invention relates to a portable electronic device including a display unit, and a method and a program for controlling the portable electronic device.

Related Art

Conventionally, in a portable electronic device including a display unit and an operation unit, when the operation unit is operated in a state where an idle screen is displayed on the display unit, a character assigned to the operation unit is input and displayed on the display unit. In such a portable electronic device, when a user selects a desired character input application in a state where a character is input thereinto, the selected character input application is activated in a state where the character is input thereinto (for example, see Patent Document 1).

On the other hand, another portable electronic device has been proposed, which activates a desired application and inputs a character by touching a display unit (for example, see Patent Document 2).

Patent Document 1: Japanese Unexamined Patent Application, Publication No. 2007-200243
Patent Document 2: Japanese Unexamined Patent Application, Publication No. H09-018566

SUMMARY

Problems to be Solved by the Invention

However, with the portable electronic devices disclosed in Patent Documents 1 and 2, a desired character input application needs to be selected from among a plurality of character input applications, and such an operation has been complicated in some cases.

An object of the present invention is to provide a portable electronic device, and a method and a program for controlling the portable electronic device, in which a desired character input application can be more easily selected.

In order to solve the above problem, the portable electronic device according to the present invention is a portable electronic device, including: a display unit; a storage unit that stores any one of end regions of the display unit and a character input application in association with each other; and a control unit. In a state where a character or an image is displayed on the display unit, when any one of the character or the image is selected, and an instruction is thereafter executed to move the character or the image to the end region, the control unit activates the character input application stored in association with the end region, and inputs the character or the image thus selected.

In order to solve the above problem, the portable electronic device according to the present invention is a portable electronic device, including: a display unit; a storage unit that stores any one of predetermined directions on the display unit and a character input application in association with each other; and a control unit. In a state where a character or an image is displayed on the display unit, when any one of the character or the image is selected, and an instruction is thereafter executed to move the character or the image in the predetermined direction, the control unit activates the character input application stored in association with the predetermined direction, and inputs the character or the image thus selected.

When selection of the character or the image is cancelled after executing the instruction to move the character or the image to the end region, it is preferable for the control unit to activate the character input application stored in association with the end region.

When selection of the character or the image is cancelled after executing the instruction to move the character or the image in the predetermined direction, it is preferable for the control unit to activate the character input application stored in association with the predetermined direction.

In a state where selection of the character or the image is maintained after executing the instruction to move the character or the image to the end region, it is preferable for the control unit to cause the display unit to display an icon corresponding to the character input application stored in association with the end region.

In a state where selection of the character or the image is maintained after executing the instruction to move the character or the image in the predetermined direction, it is preferable for the control unit to cause the display unit to display an icon corresponding to the character input application stored in association with the predetermined direction.

In a case in which the character input application thus activated is terminated, it is preferable for the control unit to cause the display unit to display a character or an image that was displayed immediately before selecting the character or the image.

It is preferable for the portable electronic device to further include a key that designates a direction, and it is preferable for the control unit to execute an instruction to move the character or the image thus selected, by an operation of the key.

It is preferable for the portable electronic device to further include a detection unit that detects a touch to the display unit, the detection unit being correspondingly disposed in a surface of the display unit. When the detection unit detects a touch to the character or the image, it is preferable for the control unit to select the character or the image. When the detection unit detects movement of the touch in a state where the touch to the character or the image thus selected is maintained, it is preferable for the control unit to execute an instruction to move the character or the image.

In order to solve the above problem, the method for controlling the portable electronic device according to the present invention includes the steps of: displaying a character or an image on a display unit; selecting any one of the character or the image by a control unit, in a state where the character or the image is displayed on the display unit; and activating, by the control unit, a character input application stored in association with an end region of the display unit, and inputting the character or the image thus selected, when an instruction is executed to move the character or the image to the end region after selecting the character or the image.

In order to solve the above problem, the method for controlling the portable electronic device according to the present invention includes the steps of: displaying a character or an image on a display unit; selecting any one of the character or the image by a control unit, in a state where the character or the image is displayed on the display unit; and activating, by the control unit, a character input application stored in association with a predetermined direction on the display unit, and inputting the character or the image thus selected, when an instruction is executed to move the character or the image in the predetermined direction after selecting the character or the image.

In order to solve the above problem, the program according to the present invention is a control program for operating a computer of a portable electronic device including a display unit, the control program causing the computer to execute the steps of: displaying a character or an image on the display unit; selecting any one of the character or the image, in a state where the character or the image is displayed on the display unit; and activating a character input application stored in association with an end region of the display unit, and inputting the character or the image thus selected, when an instruction is executed to move the character or the image to the end region after selecting the character or the image.

In order to solve the above problem, the program according to the present invention is a control program for operating a computer of a portable electronic device including a display unit, the control program causing the computer to execute the steps of: displaying a character or an image on the display unit; selecting any one of the character or the image, in a state where the character or the image is displayed on the display unit; and activating a character input application stored in association with a predetermined direction on the display unit, and inputting the character or the image thus selected, when an instruction is executed to move the character or the image in the predetermined direction after selecting the character or the image.

Effects of the Invention

According to the present invention, it is possible to provide a portable electronic device, and a method and a program for controlling the portable electronic device, in which a desired character input application can be more easily selected.

DETAILED DESCRIPTION

Figure 1:
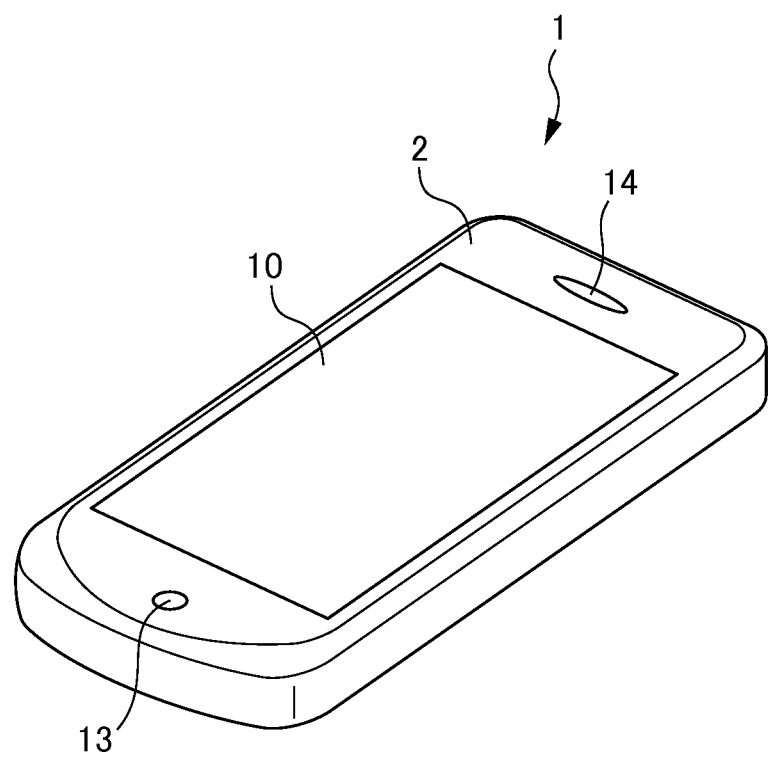
FIG. 1 is a perspective view showing an appearance of a portable telephone device.

Descriptions are hereinafter provided for embodiments of the present invention. First of all, with reference to FIG. 1, descriptions are provided for a basic structure of a portable telephone device 1 according to an embodiment of the portable electronic device of the present invention. FIG. 1 is a perspective view showing an appearance of the portable telephone device 1 according to a first embodiment.

The portable telephone device 1 includes a body 2. A touch panel 10, a microphone 13 and a speaker 14 are disposed on a front face portion of the body 2.

Figure 2:
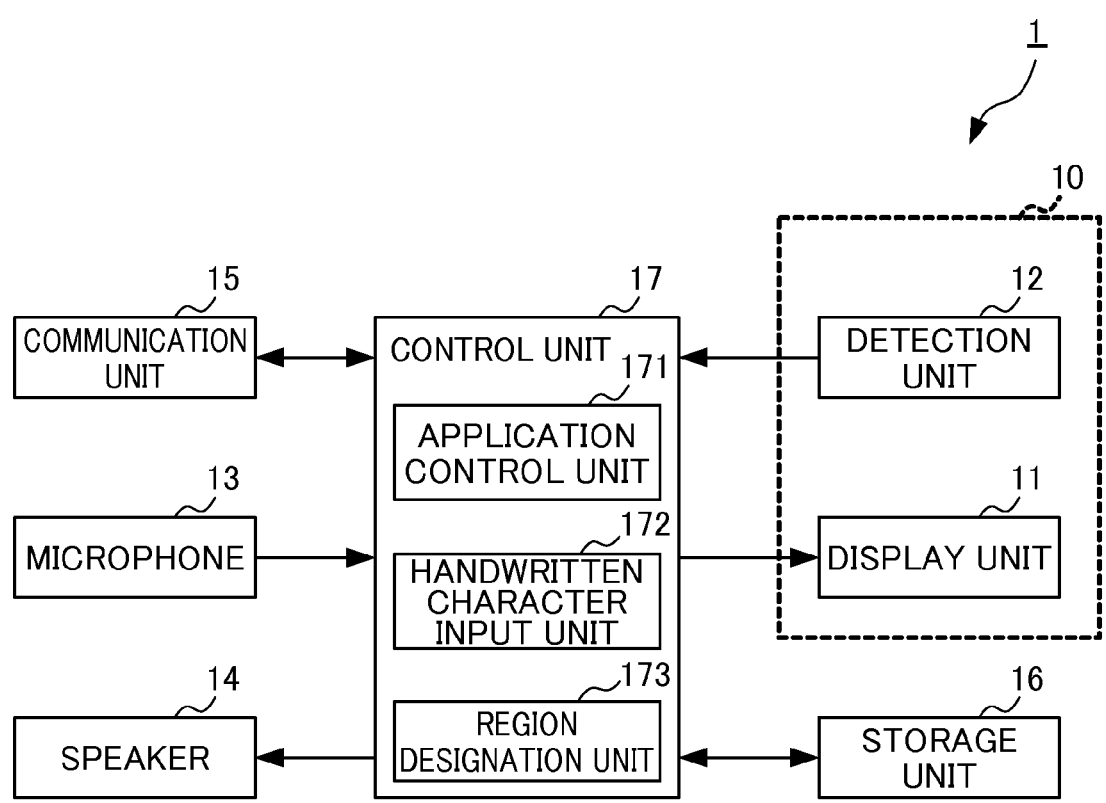
FIG. 2 is a block diagram showing a functional configuration of the portable telephone device.

The touch panel 10 includes a display unit 11 and a detection unit 12 (see FIG. 2). The display unit 11 is a liquid-crystal display panel, an organic EL (electroluminescence) display panel, or the like. The detection unit 12 is a sensor that detects a touch by an object, such as a finger or stylus of a user of the portable telephone device 1, to the display unit 11. The detection unit 12 is correspondingly disposed in the surface of the display unit 11, and for example, a sensor that employs a capacitive sensing method or a resistive film method can be utilized as the detection unit 12. It is preferable for the touch screen 10 according to the first embodiment to employ a resistive film method, an electromagnetic induction method, or a surface-type capacitive sensing method, which are capable of detecting a handwritten character that is input by a stylus 18 (see FIG. 3) to be described later.

The microphone 13 is used for inputting sound produced by the user of the portable telephone device 1 during a telephone call. The speaker 14 is used for outputting sound produced by the other party whom the user of the portable telephone device 1 is talking with.

Next, a functional configuration of the portable telephone device 1 is described with reference to FIG. 2. FIG. 2 is a block diagram showing the functional configuration of the portable telephone device 1.

The portable telephone device 1 includes the touch panel 10 (the display unit 11 and the detection unit 12), the microphone 13, and the speaker 14 as described above. The portable telephone device 1 includes a communication unit 15, a storage unit 16, and a control unit 17.

The communication unit 15 includes a main antenna (not illustrated) and an RF circuit unit (not illustrated), and makes an outgoing call to and performs communication with a predetermined contact entity. The contact entity, to which the communication unit 15 makes an outgoing call, is an emergency contact entity such as, for example, the police or fire station. The contact entity, to which the communication unit 15 makes an outgoing call, is an external device that performs a telephone call or mail transmission/reception with the portable telephone device 1, or an external device or the like such as an external web server, with which the portable telephone device 1 establishes Internet connections.

The communication unit 15 communicates with an external device via a predetermined usable frequency band. More specifically, the communication unit 15 executes demodulation processing on a signal received via the main antenna, and transmits the processed signal to the control unit 17. The communication unit 15 executes modulation processing on a signal transmitted from the control unit 17, and transmits the signal to an external device (base station) via the main antenna.

The storage unit 16 includes, for example, working memory, and is utilized for arithmetic processing by the control unit 17. The storage unit 16 stores a single or plurality of applications or databases that are operated inside the portable telephone device 1. The storage unit 16 may also serve as detachable external memory.

The control unit 17 controls the entirety of the portable telephone device 1, and controls the display unit 11 and the communication unit 15.

The storage unit 16 and the control unit 17 may be configured with a general computer. Such a general computer includes, for example, a central processing unit (CPU) as the control unit 17, and memory (RAM, ROM) and a hard disk (HDD) as the storage unit 16. In such a general computer, the control unit 17 controls the portable telephone device 1 in an integrated manner, and appropriately reads various programs from the storage unit 16 to execute the programs, thereby implementing various functions according to the present invention, in collaboration with the display unit 11, the detection unit 12, the microphone 13, the speaker 14 and the communication unit 15 that are described above.

The portable telephone device 1 has a function of starting an application by utilizing, for example, a character, an image, etc. that are displayed on the display unit 11. Descriptions are hereinafter provided for a configuration for executing the functions.

As shown in FIG. 2, the control unit 17 includes an application control unit 171, a handwritten character input unit 172, and an area designation unit 173. In a state where a character or image is displayed on the display unit 11, when any one of the character or image is selected, and an instruction is thereafter executed to move the character or image to an end region, the application control unit 171 activates a character input application stored in association with the end region, and inputs the character or image thus selected. Here, the character according to the present embodiment includes not only a hiragana character(s), a katakana character(s), a kanji character(s), but also a numeric character(s), an alphabetic character(s), and a symbol(s). The character includes not only a single character but also a character string.

The handwritten character input unit 174 inputs a handwritten character into the display unit 11 in accordance with a touch to the display unit 11. More specifically, the handwritten character input unit 172 causes the detection unit 12 to detect a track drawn by the stylus 18. For example, the handwritten character input unit 172 causes a handwritten character recognition application to perform pattern matching between the track thus detected and a character stored in a handwritten character recognition database, and converts the character with the highest recognition rate into text data. Here, the handwritten character recognition database is stored in the storage unit 16, and includes a variety of information for recognizing handwritten characters. The handwritten character recognition application is stored in the storage unit 16, and includes an algorithm for recognizing handwritten characters.

In accordance with the touch to the display unit 11, the region designation unit 173 designates a region for inputting a handwritten character into the display unit 11. More specifically, the region designation unit 173 causes the detection unit 12 to detect a track drawn by the stylus 18 on the display unit 11. The region designation unit 173 designates a region surrounded by the detected track as a region where a handwritten character can be input by the handwritten character recognition application. In a case in which the track drawn by the stylus 18 on the display unit 11 does not surround a particular region, the region designation unit 173 does not designate any region for inputting a handwritten character.

The storage unit 16 stores any one of the end regions of the display unit 11 and the character input application in association with each other. Examples of the character input application include an e-mail application, a memo pad application, a text editing application, a browser application (for example, a browser application capable of inputting characters for searching), an application for social networking services such as Twitter (registered trademark), etc.

More specifically, in the storage unit 16, for example, an end region on the right side of the display unit 11 is associated with the memo pad application. An end region on the left side of the display unit 11 is associated with the e-mail application. An end region on the upper side of the display unit 11 is associated with the text editing application. An end region on the lower side of the display unit 11 is associated with the browser application. Here, each of the end regions of the display unit 11 has a predetermined length from each edge of the display unit 11 toward the center of the display unit 11. For example, the end region on the right side of the display unit 11 is a rectangular region having a predetermined length from the edge on the right side of the display unit 11 toward the center of the display unit 11.

First Embodiment

Figure 3:
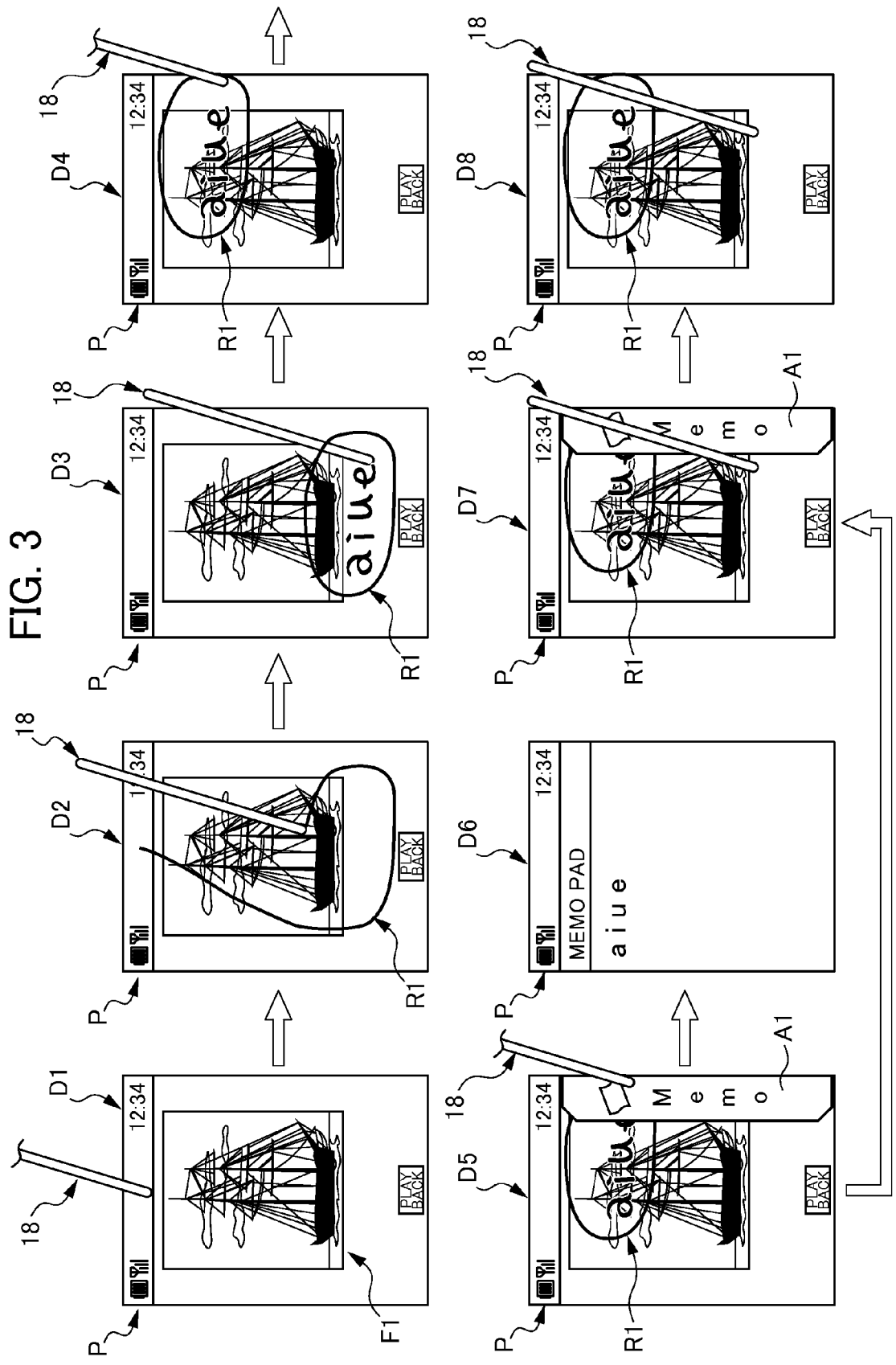
FIG. 3 is a view showing an example of transition of a screen displayed on a display unit according to a first embodiment.

FIG. 3 is a view showing an example of transition of a screen displayed on the display unit 11 according to the first embodiment. In Screen D1 of FIG. 3, the browser application is running, and an image F1 is displayed on the display unit 11.

In Screen D1 of FIG. 3, in a case in which the detection unit 12 detects a touch by the stylus 18 to a pictogram region P (Screen D1), the region designation unit 173 activates the handwritten character recognition application, and causes the detection unit 12 to detect a track drawn by the stylus 18 on the display unit 11 (Screen D2). The region designation unit 173 designates a region surrounded by the detected track as a region R1 where a handwritten character can be input by the handwritten character recognition application. When the touch by the stylus 18 to the display unit 11 is detected in this manner, in a case in which a base point of the touch is in the pictogram region P, the region designation unit 173 may designate such a region as the region R1 where a handwritten character can be input.

When the touch by the stylus 18 to the display unit 11 is detected, in a case in which the base point of the touch is on the edge of the display unit 11, the region designation unit 173 may designate such a region as the region R1 where a handwritten character can be input. This makes it possible to avoid a conflict with detection of a touch corresponding to the browser application that has already been displayed in Screen D1.

The handwritten character input unit 172 causes the detection unit 12 to detect a track drawn by the stylus 18 in the region R1 designated by the region designation unit 173.

When the track drawn by the stylus 18 on the display unit 11 surrounds a particular range, the handwritten character input unit 172 establishes the range of the track thus drawn (Screen D3).

In Screen D3, when the detection unit 12 detects a touch to the region R1 where handwritten characters "a i u e" have been input by the handwritten character input unit 172, the application control unit 171 selects the characters "a i u e" thus recognized.

In Screen D3, when the stylus 18 is operated to execute an instruction to move the region R1 (so-called drag operation) being designated by the region designation unit 173, the application control unit 171 moves the designated region R1 in accordance with the operation of the stylus 18 (Screen D4).

In a state where the selection of the region R1 is maintained, when the stylus 18 is operated to execute an instruction to move the region R1 being designated by the region designation unit 173 to an end region T1 on the right side of display unit 11, the application control unit 171 causes the display unit 11 to dynamically display an icon A1 of the memo pad application stored in association with the end region T1 on the right side, i.e. a launcher for activating the memo pad application (Screen D5).

In Screen D5, when the detection unit 12 detects release of the touch by the stylus 18 to the display unit 1, i.e. when the selection of the region R1 is cancelled, the application control unit 171 activates the character input application stored in association with the region T1 on the right side, and inputs the recognized characters "a i u e" in the region R1 (Screen D6).

In a case in which the activated memo pad application is terminated, the application control unit 171 causes the display unit 11 to display the character or image that was displayed immediately before selecting the region R1 (Screen D1).

In Screen D5, in a state where the icon A1 of the memo pad application is displayed, when the region R1 is moved by the stylus 18 to the outside of the end region T1 on the right side (Screen D7), the application control unit 171 causes the screen to transition to a state where the designated region R1 is moved in accordance with an operation of the stylus 18 similarly to Screen D4, and cancels the display of the icon A1 of the memo pad application (Screen D8).

In this way, according to the portable telephone device 1 of the first embodiment, in a state where a character or image is displayed on the display unit 11, when at least any one of the character or image (for example, the characters "a i u e" in the region R1) is selected, and an instruction is thereafter executed to move the character or image to an end region (for example, the end region T1 on the right side), the application control unit 171 activates a character input application (for example, the memo pad application) stored in association with the end region, and inputs the character or image thus selected (Screen D6). As a result, by executing an instruction to move the selected character or image to an end region, the user can activate a character input application stored in association with the end region, and can input the selected character or image. Therefore, the user can select a character input application through a simple and intuitive operation, in which the application is stored in association with an end region.

When the selection of the region R1 is cancelled after executing the instruction to move the region R1 to the end region T1, the application control unit 171 activates the memo pad application stored in association with the end region T1 (Screen D6). Therefore, upon cancelling selection of a character or image, the portable telephone device 1 activates the character input application stored in association with the end region; accordingly, the character input application can be activated through a more intuitive operation.

After executing the instruction to move the region R1 to the end region T1, in a state where the selection of the region R1 is maintained, the application control unit 171 causes the display unit to display the icon A1 corresponding to the memo pad application stored in association with the end region T1 (Screen D5). As a result, the portable telephone device 1 displays icons corresponding to character input applications stored in association with end regions, respectively; therefore, the user can intuitively recognize what type of character input application is activated, by visually observing an icon thus displayed.

In a case in which the activated memo pad application is terminated, the application control unit 171 causes the display unit 11 to display the character or image that was displayed immediately before selecting the region R1 (Screen D1). As a result, even after terminating the activated character input application, the portable telephone device 1 displays a character or image that was displayed immediately before detecting the touch; therefore, the portable telephone device 1 can improve the user-friendliness.

In place of the stylus 18, the portable telephone device 1 may further include a physical or virtual key for designating a direction, and the application control unit 171 may allow the physical or virtual key to be operated to execute an instruction to move a selected character or image. As a result, even in a case in which the physical or virtual key is operated, the portable telephone device 1 can select a character input application through a simple operation.

When the detection unit 12 detects a touch to a character or image, the application control unit 171 selects the character or image; and when the detection unit 12 detects movement of the touch in a state where the touch to the selected character or image is maintained, the application control unit 171 executes an instruction to move the character or image (Screen D4). As a result, the user can select a character input application through a simpler and more intuitive operation.

As described above, the character or image displayed on the display unit 11 is a character or image that is input by the handwritten character input unit 172. As a result, when a handwritten character is input in accordance with a touch to the display unit 11, the portable telephone device 1 inputs the handwritten character into a character input application that is activated; therefore, the character input application can be activated through a more intuitive and simpler operation. Since a handwritten character is input into an activated character input application, the portable telephone device 1 can further improve the user-friendliness when activating the character input application.

As described above, the handwritten character input unit 172 inputs a handwritten character in the region R1 being designated by the region designation unit 173. As a result, with the portable telephone device 1, since the handwritten character in the designated region R1 is input into the character input application, a character can be input into the character input application through a more intuitive operation.

Figure 4:
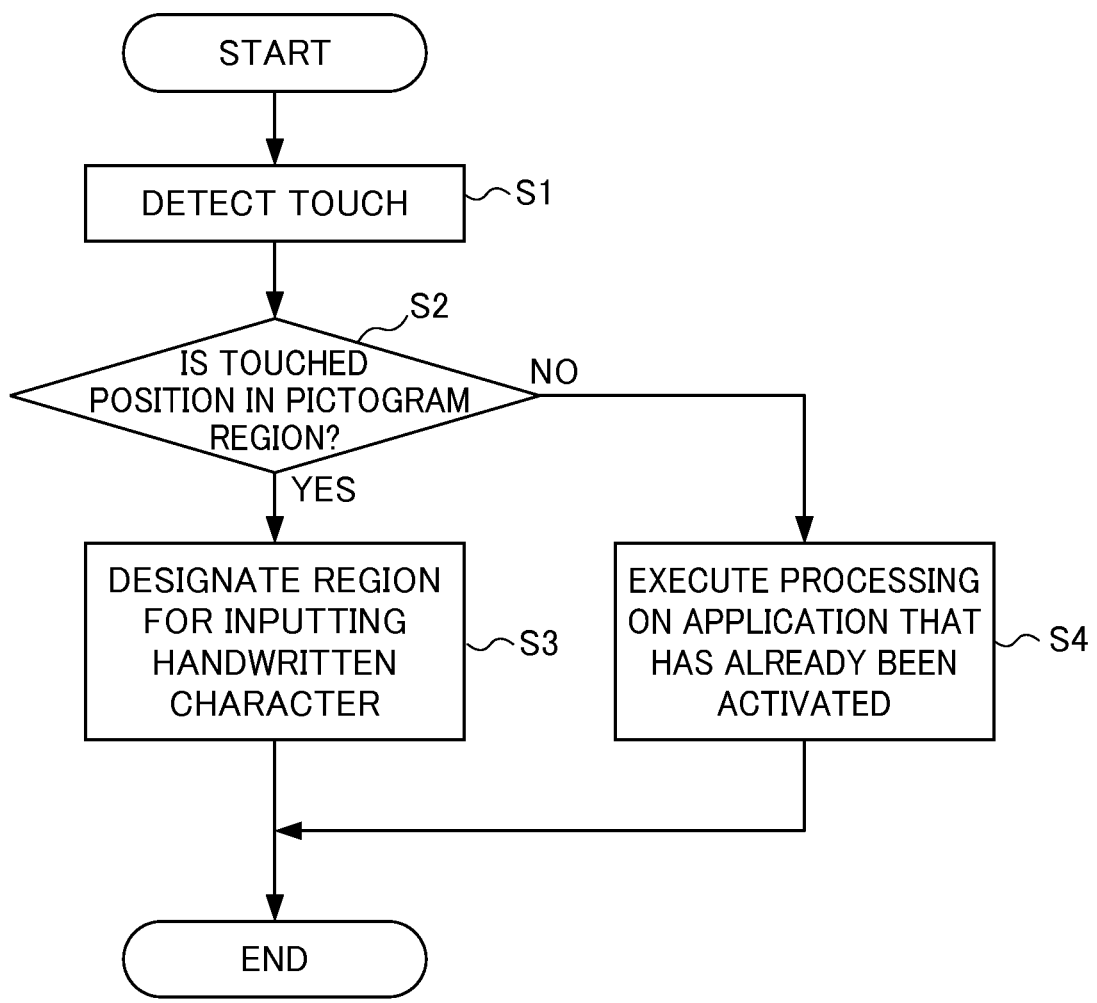
FIG. 4 is a flowchart showing processing by a detection unit to detect a touch by a stylus to a touch screen.
Figure 5:
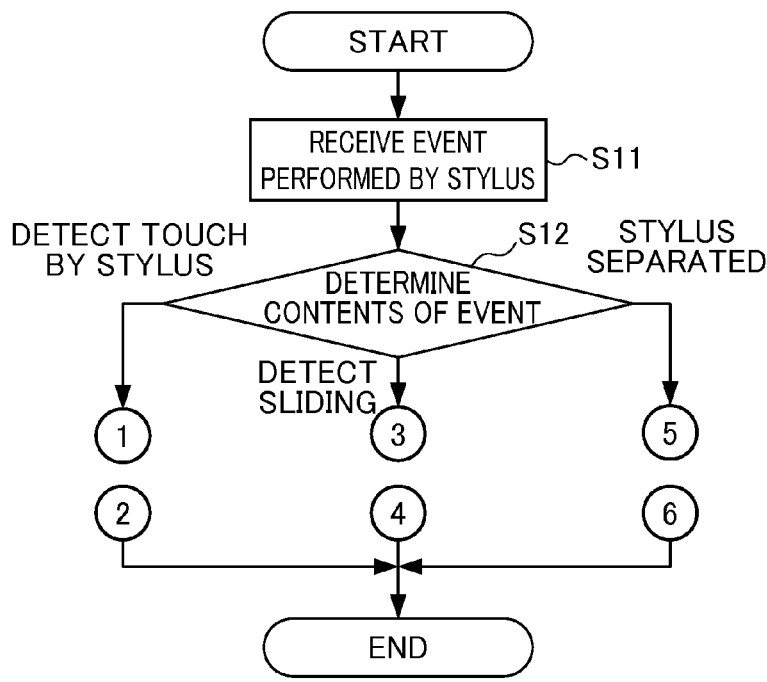
FIG. 5 is a flowchart (1) showing processing by an application control unit.

Next, with reference to FIGS. 4 to 8, descriptions are provided for processing in the first embodiment in a case in which an application is activated by utilizing a character displayed on the display unit 11. FIG. 4 is a flowchart showing processing by the detection unit 12 to detect a touch by the stylus 18 to the touch screen 10. In Step S1, the application control unit 171 causes the detection unit 12 to detect a touch by the stylus 18 to the touch screen 10. In Step S2, the application control unit 171 determines whether the touched position is a position displaying the pictogram region P. In a case in which the position is a position displaying the pictogram region P (YES), the processing advances to Step S3. In a case in which the position is not a position displaying the pictogram region P (NO), the processing advances to Step S4.

In Step S3, the application control unit 171 designates a region for inputting a handwritten character. After designating a region, a handwritten character can be input in the region. In Step S4, the application control unit 171 executes processing on the application that has already been activated. For example, if the browser application has already been activated, item selection and the like are enabled in the browser application.

FIGS. 5 to 8 are flowcharts showing processing by the application control unit 171. In Step S11, the application control unit 171 receives an event performed by the stylus 18, the event being transmitted in Step S3.

In Step S12, the application control unit 171 determines contents of the event performed by the stylus 18. More specifically, the application control unit 171 determines whether the event performed by the stylus 18 corresponds to: a case in which a touch by the stylus 18 is detected; a case in which the stylus 18 is moved on the touch screen 10 while the touch by the stylus 18 is being detected; or a case in which the stylus 18 is separated from the touch screen 10.

Figure 6:
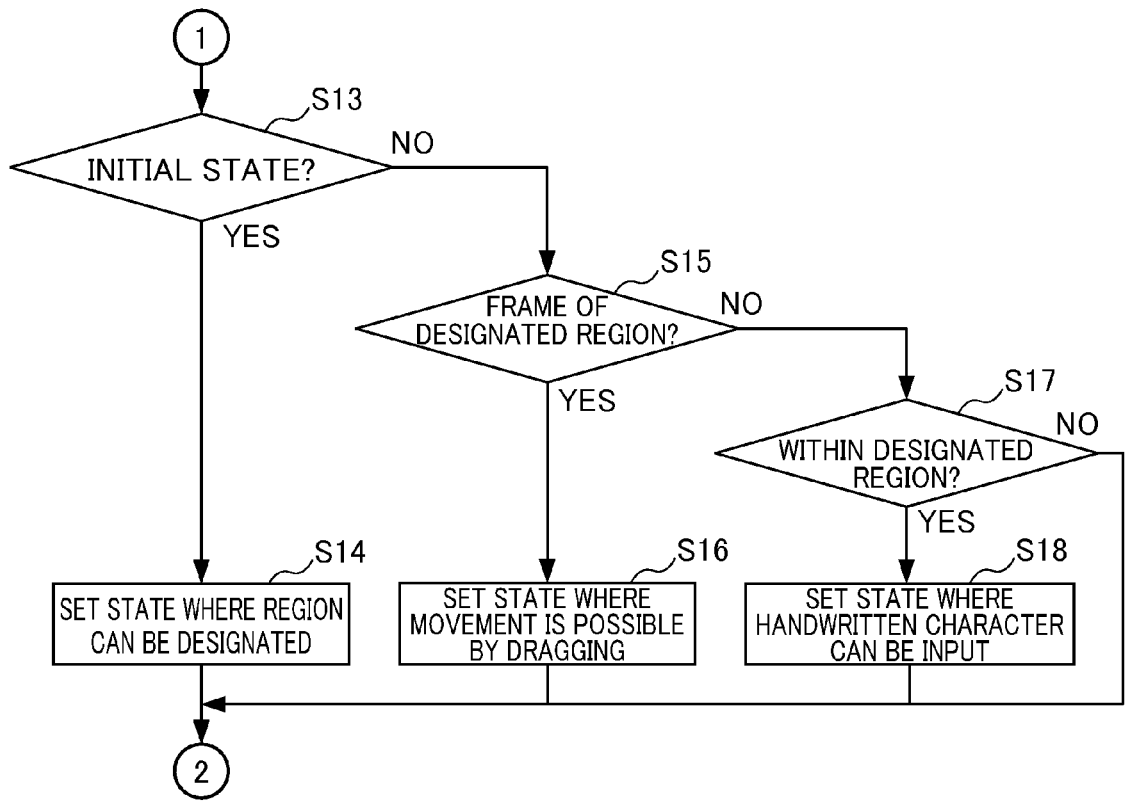
FIG. 6 is a flowchart (2) showing processing by the application control unit.
Figure 7:
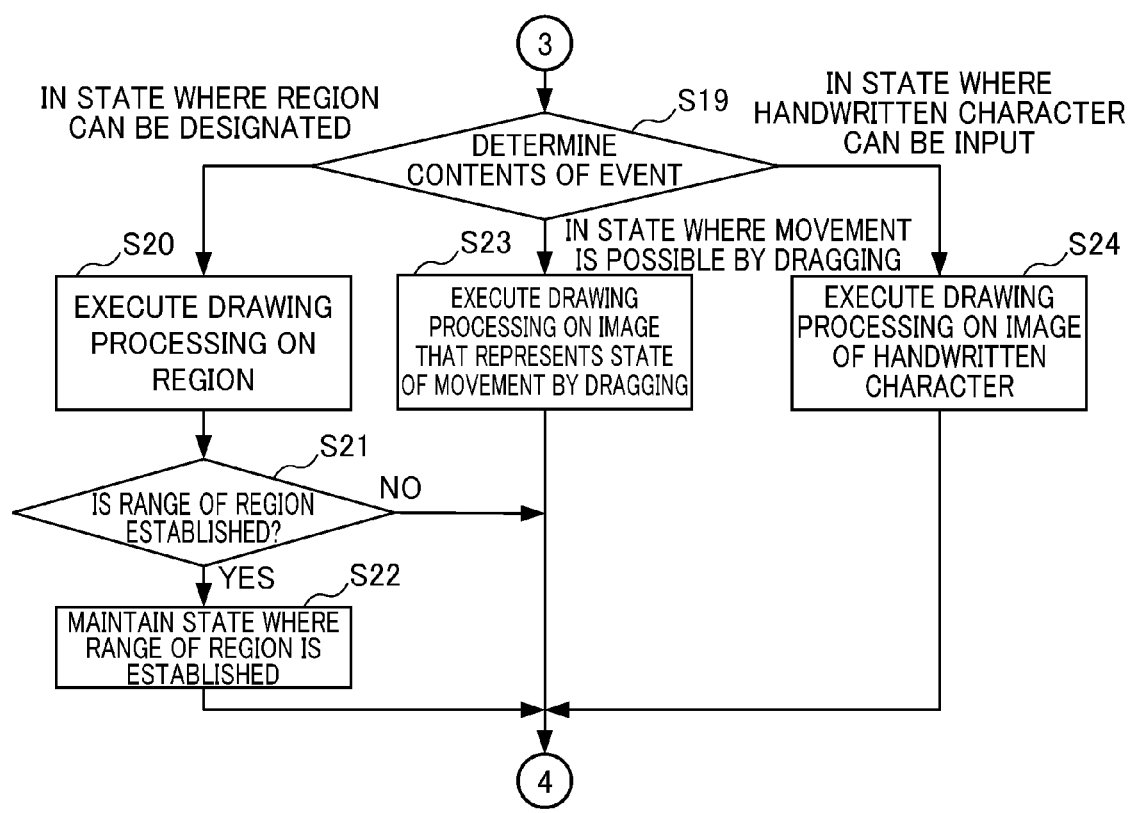
FIG. 7 is a flowchart (3) showing processing by the application control unit.
Figure 8:
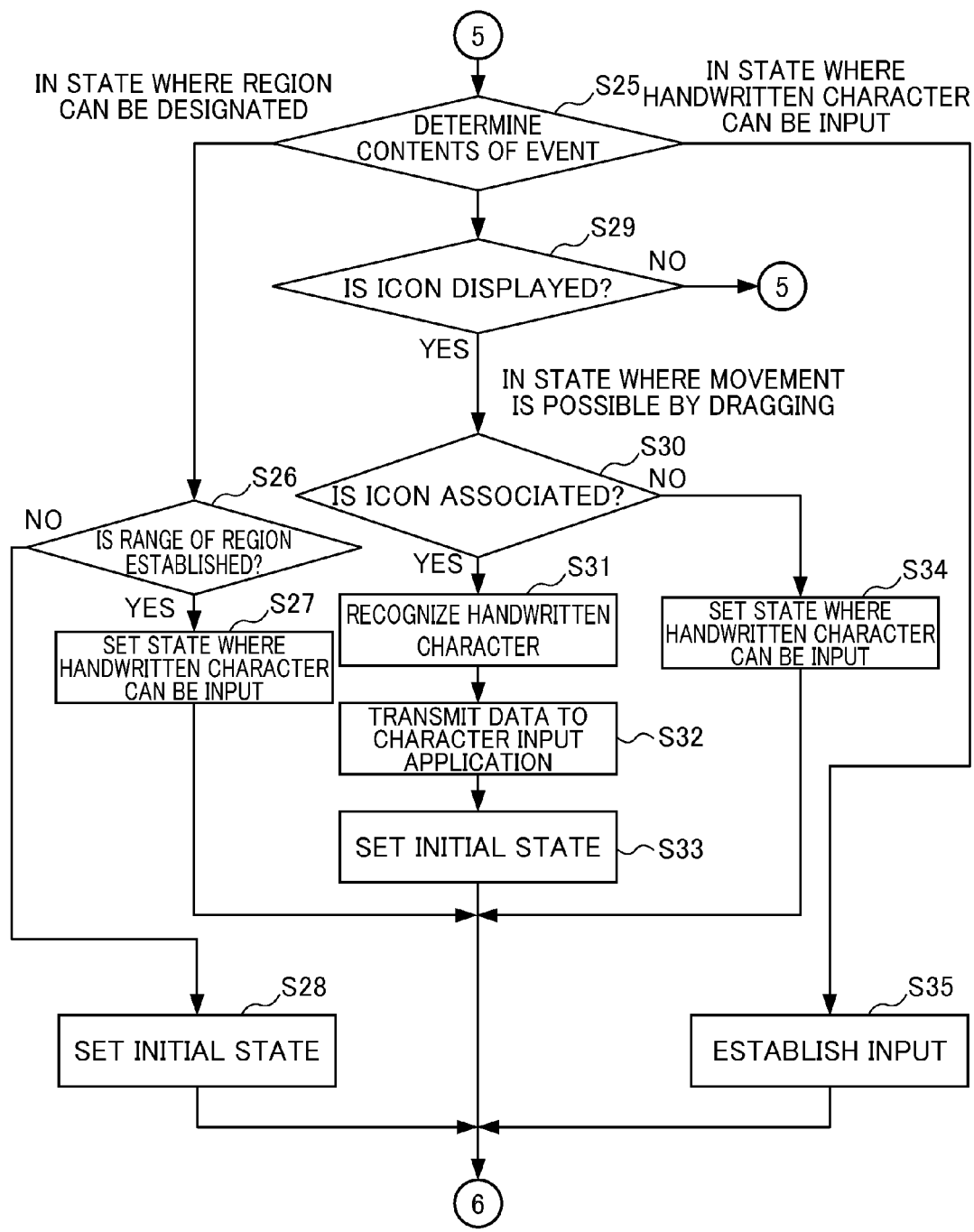
FIG. 8 is a flowchart (4) showing processing by the application control unit.

In a case in which a touch by the stylus 18 is detected, the processing advances to Step S13 (see FIG. 6). In a case in which the stylus 18 is moved on the touch screen 10 while the touch by the stylus 18 is being detected (a slide is detected), the processing advances to Step S19 (see FIG. 7). In a case in which the stylus 18 is separated from the touch screen 10, the processing advances to Step S25 (see FIG. 8).

In Step S13, the application control unit 171 determines whether the region designation unit 173 is in a state where no region has been designated, i.e. whether the state of the region designation unit 173 is an initial state. In a case in which the state is the initial state (YES), the processing advances to Step S14. In a case in which the state is not the initial state (NO), the processing advances to Step S15.

In Step S14, the application control unit 171 activates the handwritten character recognition application, and sets a state where a region can be designated by the region designation unit 173. In Step S15, the application control unit 171 determines whether the stylus 18 touches a frame of the region designated by the region designation unit 173. In a case in which the frame of the region designated by region designation unit 173 is touched (YES), the processing advances to Step S16. In a case in which the frame of the region designated by region designation unit 173 is not touched (NO), the processing advances to Step S17.

In Step S16, the application control unit 171 sets a state where the region designated by the region designation unit 173 as well as the handwritten character(s) in the region can be integrally moved by dragging the stylus 18.

In Step S17, the application control unit 171 determines whether the touch is within the designated region. In a case in which the touch is within the designated region (YES), the processing advances to Step S18. In a case in which the touch is not within the designated region (NO), the processing is terminated.

In Step S18, the application control unit 171 sets the region designated by the region designation unit 173 to a state where a handwritten character can be input by the handwritten character input unit 172.

In Step S19, the application control unit 171 determines contents of the event performed by the stylus 18. More specifically, in a case of a state where a region can be designated by the region designation unit 173, the processing advances to Step S20. In a case of a state where the region as well as the handwritten character in the region can be moved by dragging the stylus 18, the processing advances to Step S23. In a case of a state where handwritten character input unit 172 can input a handwritten character in the designated region, the processing advances to Step S24.

In Step S20, the region designation unit 173 activates the handwritten character recognition application, and causes the detection unit 12 to detect a track drawn by the stylus 18 on the display unit 11. The region designation unit 173 executes drawing processing on a region surrounded by the detected track, and designates the region as a region where a handwritten character can be input.

In Step S21, the application control unit 171 determines whether a range of the region designated by the region designation unit 173 is established. In a case in which the range of the region is established (YES), the processing advances to Step S22. In a case in which the range of the region is not established (NO), the processing is terminated.

In Step S22, the application control unit 171 maintains the state where the range of the region designated by region the designation unit 173 is established. In Step S23, the application control unit 171 causes the handwritten character recognition application to execute drawing processing on an image indicating a state where the region designated by the region designation unit as well as the handwritten character in the region are moved by dragging the stylus 18.

In Step S24, the application control unit 171 causes the handwritten character recognition application to execute the drawing processing on the image of the handwritten characters being input by the handwritten character input unit 172.

In Step S25, the application control unit 171 determines contents of the event performed by the stylus 18. More specifically, in a case of a state where a region can be designated by the region designation unit 173, the processing advances to Step S26. In a case of a state where the region as well as the handwritten character in the region can be moved by dragging the stylus 18, the processing advances to Step S29. In a case of a state where handwritten character input unit 172 can input a handwritten character in the designated region, the processing advances to Step S35.

In Step S26, the application control unit 171 determines whether a range of the region designated by the region designation unit 173 is established. In a case in which the range of the region is established (YES), the processing advances to Step S27. In a case in which the range of the region is not established (NO), the processing advances to Step S28.

In Step S27, the application control unit 171 sets the region designated by the region designation unit 173 to a state where a handwritten character can be input by the handwritten character input unit 172. In Step S28, the application control unit 171 sets the region designation unit 173 to a state where no region has been designated, i.e. sets the region designation unit 173 to the initial state.

In Step S29, the application control unit 171 determines whether an icon of a character input application associated with any one of the end regions is displayed on the display unit 11. In a case in which an icon is displayed (YES), the processing advances to Step S30. In a case in which an icon is not displayed (NO), the processing returns to Step S25.

In Step S30, the application control unit 171 determines whether the stylus 18 is operated to drag the region designated by the region designation unit 173 to any one of the icons of the character input applications, and whether the icon is associated with any one of the character input applications. In a case in which the icon is associated with a character input application (YES), the processing advances to Step S31. In a case in which the icon is not associated with a character input application (NO), the processing advances to Step S34.

In Step S31, the handwritten character input unit 172 causes the handwritten character recognition application to perform pattern matching between the track thus detected and a character stored in a handwritten character recognition database, and converts the character with the highest recognition rate into text data.

In Step S32, the handwritten character input unit 172 transmits the converted text data to the character input application associated with the icon. In Step S33, the application control unit 171 sets the region designation unit 173 to a state where no region has been designated, i.e. sets the region designation unit 173 to the initial state.

In Step S34, the application control unit 171 sets the region designated by the region designation unit 173 to a state where a handwritten character can be input by the handwritten character input unit 172. In Step S35, the handwritten character input unit 172 establishes an input of the track drawn by the stylus 18.

In this way, according to the portable telephone device 1 of the first embodiment, the application control unit 171 can activate a character input application through an intuitive operation using a character or image displayed on the display unit 11, and can input the selected character or image into the character input application.

Second Embodiment

Next, descriptions are provided for a second embodiment according to the portable electronic device of the present invention. The second embodiment is described mainly in terms of differences from the first embodiment, and configurations similar to those in the first embodiment are assigned with the same reference symbols, and descriptions thereof are omitted. The description regarding the first embodiment is applied as appropriate where a description is not particularly provided for the second embodiment.

The portable telephone device 1 according to the second embodiment is different from that of the first embodiment in executing an instruction to move a character or image in a predetermined direction, in place of the instruction to move the character or image to an end region.

More specifically, in a state where a character or image is displayed on the display unit 11, when any one of the character or image is selected, and an instruction is thereafter executed to move the character or image in a predetermined direction (for example, by a rightward sliding operation), the application control unit 171 activates a character input application stored in association with the predetermined direction, and inputs the character or image thus selected.

The storage unit 16 stores any one of predetermined directions on the display unit 11 and the character input application in association with each other.

More specifically, in the storage unit 16, for example, a rightward sliding operation on the display unit 11 is associated with the memo pad application. A leftward sliding operation on the display unit 11 is associated with the e-mail application. An upward sliding operation on the display unit 11 is associated with the text editing application. A downward sliding operation on the display unit 11 is associated with the browser application.

In this way, with the portable telephone device 1, by executing an instruction to move the selected character or image in a predetermined direction, the user can activate a character input application stored in association with the predetermined direction, and can input the selected character or image. Therefore, the user can select a character input application through a simple and intuitive operation, in which the application is stored in association with the predetermined direction.

Figure 9:
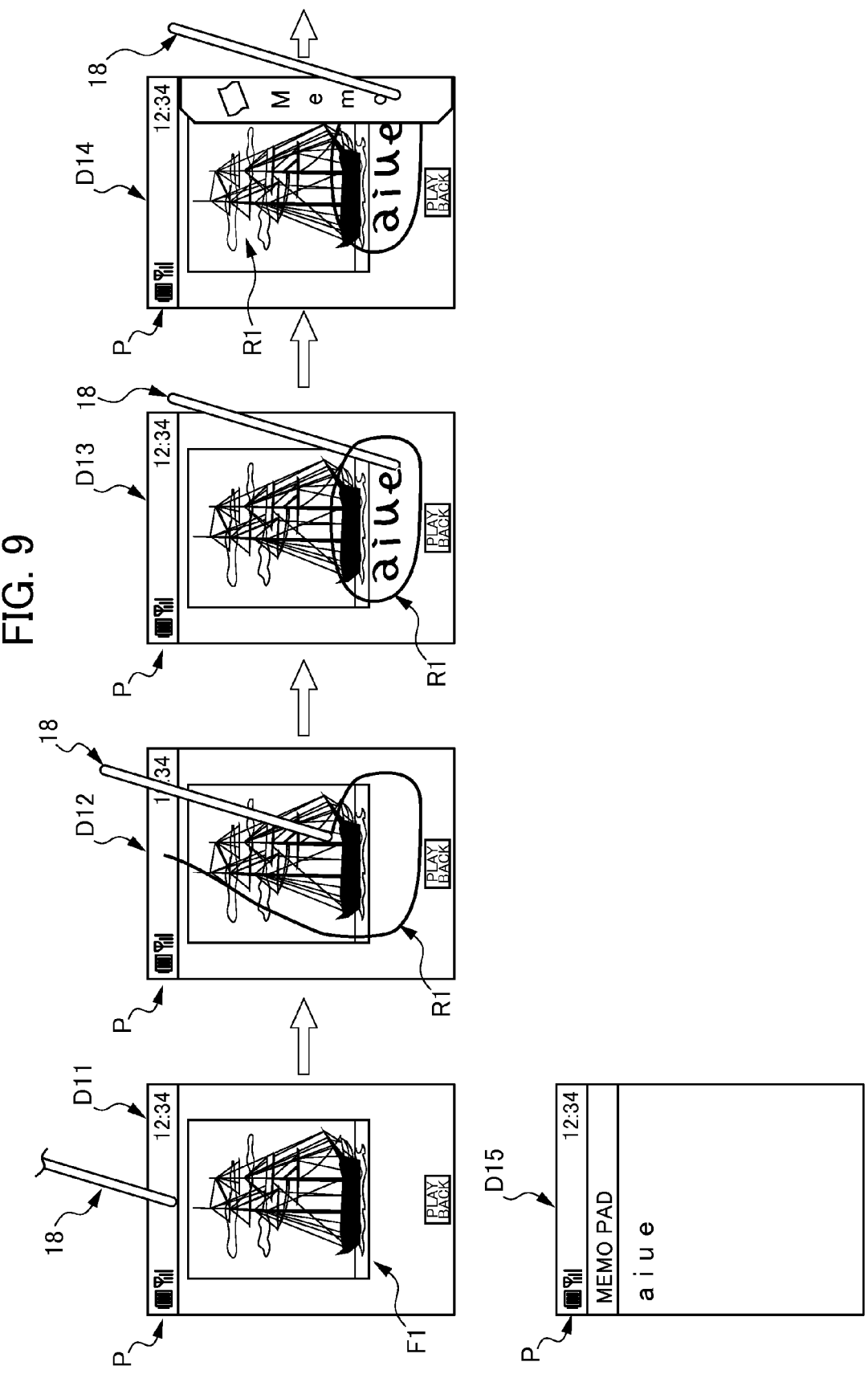
FIG. 9 is a view showing an example of transition of a screen displayed on the display unit according to a second embodiment.

FIG. 9 is a view showing an example of transition of a screen displayed on the display unit 11 according to the second embodiment. In Screen D11 of FIG. 3, the browser application is running, and the image F1 is displayed on the display unit 11.

In Screen D11 of FIG. 9, in a case in which the detection unit 12 detects a touch by the stylus 18 to the pictogram region P (Screen D11), the region designation unit 173 activates the handwritten character recognition application, and causes the detection unit 12 to detect a track drawn by the stylus 18 on the display unit 11 (Screen D12). The region designation unit 173 designates a region surrounded by the detected track as the region R1 where a handwritten character can be input by the handwritten character recognition application. The handwritten character input unit 172 causes the detection unit 12 to detect a track drawn by the stylus 18 in the region R1 designated by the region designation unit 173.

When the track drawn by the stylus 18 on the display unit 11 surrounds a particular range, the handwritten character input unit 172 establishes the range of the track thus drawn (Screen D13).

In Screen D13, when the detection unit 12 detects a touch to the region R1 where handwritten characters "a i u e" have been input by the handwritten character input unit 172, the application control unit 171 selects the characters "a i u e" thus recognized.

In a state where the selection of the region R1 is maintained, when an instruction is executed by operating the stylus 18 to slide (flick or swipe, as it is called) the region R1 being designated by the region designation unit 173 in a direction toward the right side of display unit 11, the application control unit 171 causes the display unit to dynamically display the icon A1 of the memo pad application stored in association with the direction toward the right side, i.e. the launcher for activating the memo pad application (Screen D14).

As a result, the portable telephone device 1 displays icons corresponding to character input applications stored in association with predetermined directions, respectively; therefore, the user can intuitively recognize what type of character input application is activated, by visually observing an icon thus displayed.

In Screen D14, when the detection unit 12 detects release of the touch by the stylus 18 to the display unit 1, i.e. when the selection of the region R1 is cancelled, the application control unit 171 activates the character input application stored in association with a sliding operation in the direction toward the right side, and inputs the recognized characters "a i u e" in the region R1 (Screen D15). Upon cancelling selection of a character or image, the portable telephone device 1 activates the character input application stored in association with the predetermined direction; therefore, the character input application can be activated through a more intuitive operation.

In a case in which the activated memo pad application is terminated, the application control unit 171 causes the display unit 11 to display the character or image that was displayed immediately before selecting the region R1 (Screen D11).

Although the embodiments of the present invention have been described above, the present invention is not limited to the aforementioned embodiments, and can be modified as appropriate. For example, an application associated with an end region or a predetermined direction may be set by the user, or may be set in advance. In a case in which a sliding operation in a predetermined direction or to an end region is associated with the e-mail application, and an address in an address book is included in a selected character, the address in the address book corresponding to the selected character may be input into a destination field of the e-mail application that is activated.

Figure 10:
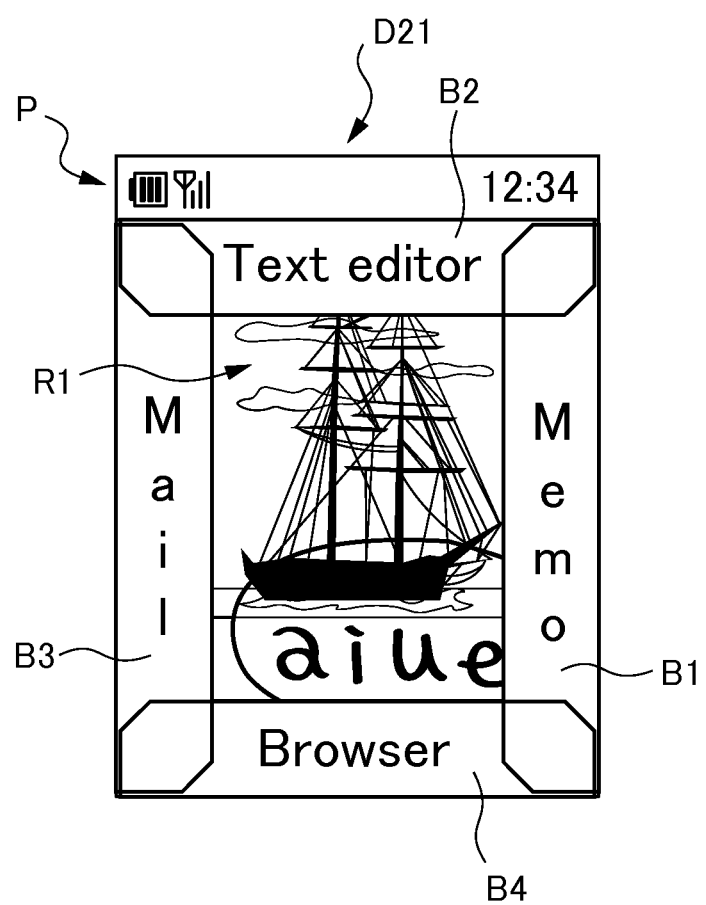
FIG. 10 is an example of a screen showing icons of character input applications associated with end regions, respectively, of the display unit.

FIG. 10 is an example of a screen showing icons of the character input applications associated with the end regions, respectively, of the display unit 11. In the example of the screen shown in FIG. 10, the memo pad application is associated with the end region on the right side of display unit 11, and an icon B1 of the memo pad application can be displayed. The text editing application (text editor) is associated with the end region on the upper side of the display unit 11, and an icon B2 of the text editing application can be displayed. The e-mail application is associated with the end region on the left side of the display unit 11, and an icon B3 of the e-mail application can be displayed. The browser application is associated with the end region on the lower side of the display unit 11, and an icon B4 of the browser application can be displayed. FIG. 10 is a view showing the example of the icons B1 to B4. In reality, the icons B1 to B4 are not concurrently displayed on the display unit 11, but each one of the icons B1 to B4 is displayed at one time.

Figure 11:
FIG. 11 is an example showing a setting screen for the character input applications associated with the end regions, respectively, shown in FIG. 10.

FIG. 11 is an example showing a setting screen for the character input applications associated the end regions, respectively, shown in FIG. 10. As shown in FIG. 11, in the setting screen, the control unit 17 causes the display unit 11 to display the end regions (upper side, lower side, left side, right side) and the character input applications that can be associated with the end regions, respectively. In accordance with arbitrary selection by the user, the control unit 17 sets the character input applications that can be associated with the end regions, respectively. For example, in FIG. 10, in accordance with selection by the user, the control unit 17 sets (changes) the memo pad application being assigned to the end region on the right side to a Twitter (registered trademark) application. The control unit 17 sets the display unit 11 to a state where the Twitter (registered trademark) application associated with the end region on the right side can be displayed, in place of the icon of the memo pad application.

In the embodiments described above, the handwritten character input unit 172 detects a track (character or image) drawn by the stylus 18 after a region is designated by the region designation unit 173; however, the present invention is not limited thereto. For example, a region may be designated by the region designation unit 173 after the handwritten character input unit 172 detects a track (character or image) drawn by the stylus 18.

The embodiments have been described above for the example, in which the browser application is running, and the image F1 is displayed on the display unit 11; however, the present invention can also be applied to a case starting from a state where other applications are running. The present invention can also be applied to a case starting from a state where an idle screen is displayed.

The portable telephone device 1 as a portable electronic device has been described in the aforementioned embodiments; however, the present invention can be applied to other portable electronic devices. For example, the portable electronic device of the present invention may be a digital camera, a PHS (Personal Handyphone System), a PDA (Personal Digital Assistant), a portable navigation device, a personal computer, a notebook PC, a mobile gaming device or the like.

EXPLANATION OF REFERENCE NUMERALS

1 portable telephone device (portable electronic device)
10 touch panel
11 display unit
12 detection unit
17 control unit
171 application control unit
172 handwritten character input unit
173 region designation unit

What is claimed is:

1. A portable electronic device, comprising:
a display;
a sensor configured to detect an input of a handwritten character or handwritten image inputted by a touch on the display;
a memory configured to store
any one of end regions of the display, and
a character input application in association with one of the end regions; and
a processor configured to
accept an input for designating a region on the display when a predefined pictogram region on a screen is touched during execution of a further application,
based on the touch of the predefined pictogram region on the screen, accept hand drawn input for identifying a region on the screen as the designated region, wherein the designated region accepts input of the handwritten character or handwritten image, and
cause the sensor to detect the input of the handwritten character or handwritten image in the designated region,
wherein
the display is configured to display (i) the screen of the further application different from the character input application during the identification of the designated region and the input of the handwritten character or handwritten image in the designated region and (ii) the inputted image or character superimposing over the screen of the further application, and
wherein the inputted character or image is separate from and unrelated to the further application, and
in a state where the detected inputted character or image is superimposing over the screen of the further application on the display,
when
any one of the detected inputted character or image is selected in response to a touch on the inputted character or image, an instruction is thereafter executed to move the selected character or image to one of the end regions based on a drag operation, and a selection of said one of the detected inputted character or image is cancelled in response to a release of the touch from the inputted character or image, the processor is configured to activate the character input application stored in association with said one of the end regions based on the drag operation of the selected character or image to said one of the end regions, and input the selected character or image into the activated character input application.

2. The portable electronic device according to claim 1, wherein, in a state where selection of the detected inputted character or image is maintained after executing the instruction to move the selected character or image to said one of the end regions, the processor is configured to cause the display to display an icon corresponding to the character input application stored in association with said one of the end regions.

3. The portable electronic device according to claim 1, wherein, when the activated character input application is terminated, the processor is configured to cause the display to display a character or an image that was displayed immediately before selecting the detected inputted character or image.

4. The portable electronic device according to claim 1, further comprising:

a key that designates a direction, wherein the processor is configured to execute an instruction to move the selected character or image, by an operation of the key.

5. The portable electronic device according to claim 1, wherein the sensor is disposed in a surface of the display, when the sensor detects a further touch to the inputted character or image that was inputted by the touch on the display, the processor is configured to select the inputted character or the image, and when the sensor detects a movement of the further touch in a state where the further touch to the selected character or image is maintained, the processor is configured to execute the instruction to move the selected character or image.

6. The portable electronic device according to claim 1, wherein the processor is configured to enable to input the handwritten character or handwritten image in response to a detection that a predetermined track is drawn on the display.

7. A portable electronic device, comprising:

a display;

a sensor configured to detect an input of a handwritten character or handwritten image inputted by a touch on the display;

a memory configured to store any one of predetermined directions on the display, and a character input application in association with one of the predetermined directions; and a processor configured to accept an input for designating a region on the display when a predefined pictogram region on a screen is touched during execution of a further application, based on the touch of the predefined pictogram region on the screen, accept hand drawn input for identifying a region on the screen as the designated region, wherein the designated region accepts input of the handwritten character or handwritten image, and cause the sensor to detect the input of the handwritten character or handwritten image in the designated region, wherein the display is configured to display (i) the screen of the further application different from the character input application during the identification of the designated region and the input of the handwritten character or handwritten image in the designated region and (ii) the inputted image or character superimposing over the screen of the further application, and wherein the inputted character or image is separate from and unrelated to the further application, and in a state where the detected inputted character or image is superimposing over the screen of the further application on the display, when any one of the detected inputted character or image superimposing over the screen of the further application is selected in response to a touch on the inputted character or image, an instruction is thereafter executed to move the selected character or image in one of the predetermined directions based on a drag operation, and a selection of said one of the detected inputted character or image is cancelled in response to a release of the touch from the inputted character or image, the processor is configured to activate the character input application stored in association with said one of the predetermined directions based on the drag operation of the selected character or image in said one of the predetermined directions, and input the selected character or image into the activated character input application.

8. The portable electronic device according to claim 7, wherein, in a state where selection of the detected inputted character or image is maintained after executing the instruction to move the selected character or image in said one of the predetermined directions, the processor is configured to cause the display to display an icon corresponding to the character input application stored in association with said one of the predetermined directions.

9. A method of controlling a portable electronic device including a display, a sensor, and a processor, the method comprising:

storing any one of end regions of the display, and a character input application in association with one of the end regions;

accepting an input for designating a region on the display when a predefined pictogram region on a screen is touched during execution of a further application;

based on the touch of the predefined pictogram region on the screen, accepting hand drawn input for identifying a region on the screen as the designated region, wherein the designated region accepts input of a handwritten character or handwritten image by a touch;

detecting, by the sensor, the input of the handwritten character or handwritten image inputted by the touch in the designated region on the display;

displaying, on the display, (i) the screen of the further application different from the character input application during the identification of the designated region and the input of the handwritten character or handwritten image in the designated region and (ii) the detected character or image superimposing over the screen of the further application, wherein the inputted character or image is separate from and unrelated to the further application;

in a state where the detected inputted character or image is superimposing over the screen of the further application on the display,
when
any one of the detected character or image by the processor is selected in response to a touch on the inputted character or image,
an instruction is executed to move the selected character or image to said one of the end regions based on a drag operation after said selecting, and
a selection of said one of the detected inputted character or image is cancelled in response to a release of the touch from the inputted character or image,
activating, by the processor, the character input application stored in association with said one of the end regions based on the drag operation of the selected character or image to said one of the end regions; and
inputting the selected character or image into the activated character input application.

10. A method of controlling a portable electronic device including a display, a sensor, and a processor, the method comprising:
storing
any one of end regions of the display, and
a character input application in association with one of the predetermined directions;
accepting an input for designating a region on the display when a predefined pictogram region on a screen is touched during execution of a further application;
based on the touch of the predefined pictogram region on the screen, accepting hand drawn input for identifying a region on the screen as the designated region, wherein the designated region accepts input of a handwritten character or handwritten image by a touch;
detecting, by the sensor, the input of the handwritten character or handwritten image inputted by the touch in the designated region on the display;
displaying, on the display, (i) the screen of the further application different from the character input application during the identification of the designated region and the input of the handwritten character or handwritten image in the designated region and (ii) the detected character or image superimposing over the screen of the further application, wherein the inputted character or image is separate from and unrelated to the further application;
in a state where the detected inputted character or image is superimposing over the screen of the further application on the display,
when
any one of the detected character or image by the processor is selected in response to a touch on the inputted character or image,
an instruction is executed to move the selected character or image in said one of the predetermined directions based on a drag operation after said selecting, and
a selection of said one of the detected inputted character or image is cancelled in response to a release of the touch from the inputted character or image,
activating, by the processor, the character input application stored in association with said one of the predetermined directions based on the drag operation of the selected character or image in said one of the predetermined directions; and
inputting the selected character or image into the activated character input application.

11. A non-transitory computer-readable medium that stores a program for operating a portable electronic device including a display, a sensor, and a processor, the program causing the portable electronic device to execute:
storing
any one of end regions of the display, and
a character input application in association with one of the end regions;
accepting an input for designating a region on the display when a predefined pictogram region on a screen is touched during execution of a further application;
based on the touch of the predefined pictogram region on the screen, accepting hand drawn input for identifying a region on the screen as the designated region, wherein the designated region accepts input of a handwritten character or handwritten image by a touch;
detecting, by the sensor, the input of the handwritten character or handwritten image inputted by the touch in the designated region on the display;
displaying, on the display, (i) the screen of the further application different from the character input application during the identification of the designated region and the input of the handwritten character or handwritten image in the designated region and (ii) the detected character or image superimposing over the screen of the further application, wherein the inputted character or image is separate from and unrelated to the further application;
in a state where the detected inputted character or image is superimposing over the screen of the further application on the display,
when
any one of the detected character or image by the processor is selected in response to a touch on the inputted character or image,
an instruction is executed to move the selected character or image to said one of the end regions based on a drag operation after said selecting, and
a selection of said one of the detected inputted character or image is cancelled in response to a release of the touch from the inputted character or image,
activating, by the processor, the character input application stored in association with said one of the end regions based on the drag operation of the selected character or image to said one of the end regions; and
inputting the selected character or image into the activated character input application.

12. A non-transitory computer-readable medium that stores a program for operating a portable electronic device including a display, a sensor, and a processor, the program causing the portable electronic device to execute:
storing
any one of end regions of the display, and
a character input application in association with one of predetermined directions;
accepting an input for designating a region on the display when a predefined pictogram region on a screen is touched during execution of a further application;
based on the touch of the predefined pictogram region on the screen, accepting hand drawn input for identifying a region on the screen as the designated region, wherein the designated region accepts input of a handwritten character or handwritten image by a touch;

detecting by the sensor, the input of the handwritten character or handwritten image inputted by the touch in the designated region on the display;

displaying, on the display, (i) the screen of the further application different from the character input application during the identification of the designated region and the input of the handwritten character or handwritten image in the designated region and (ii) the detected character or image superimposing over the screen of the further application, wherein the inputted character or image is separate from and unrelated to the further application;

in a state where the detected inputted character or image is superimposing over the screen of the further application on the display, when any one of the detected character or image by the processor is selected in response to a touch on the inputted character or image, an instruction is executed to move the selected character or image in said one of the predetermined directions based on a drag operation after said selecting, and a selection of said one of the detected inputted character or image is cancelled in response to a release of the touch from the inputted character or image, activating, by the processor, the character input application stored in association with said one of the predetermined directions based on the drag operation of the selected character or image in said one of the predetermined directions; and inputting the selected character or image into the activated character input application.

* * * * *